United States Patent [19]
Yanagida et al.

[11] Patent Number: 4,757,487
[45] Date of Patent: Jul. 12, 1988

[54] METHOD AND APPARATUS FOR DETECTING TRACK CROSSINGS ON AN OPTICAL DISC

[75] Inventors: Tsuneo Yanagida; Kiichi Kato, both of Tokyo, Japan

[73] Assignee: Olympus Optical Company Limited, Tokyo, Japan

[21] Appl. No.: 734,774

[22] Filed: May 16, 1985

[30] Foreign Application Priority Data

May 18, 1984 [JP] Japan ................... 59-99736

[51] Int. Cl.$^4$ ............ G11B 7/095; G11B 7/085; G11B 21/08
[52] U.S. Cl. .................... 369/46; 369/32; 369/45
[58] Field of Search ................ 369/44–46, 369/32, 109, 33, 41; 250/201 DF

[56] References Cited

U.S. PATENT DOCUMENTS

| | | | |
|---|---|---|---|
| 4,484,319 | 11/1984 | Koishi et al. | 369/46 |
| 4,504,938 | 3/1985 | Tajima | 369/46 |
| 4,512,004 | 4/1985 | Nonaka | 369/45 |
| 4,525,826 | 6/1985 | Nakamura et al. | 369/46 |
| 4,546,460 | 10/1985 | Ando | 369/45 |

FOREIGN PATENT DOCUMENTS

59-207033  11/1984  Japan ........................ 369/45

Primary Examiner—Raymond F. Cardillo
Assistant Examiner—Steven R. Garland
Attorney, Agent, or Firm—Robert E. Burns; Emmanuel J. Lobato

[57] ABSTRACT

In a method of detecting track crossings on an optical disc, a light source irradiates a light beam onto an optical disc having guide tracks in the form of a recess and the light beam is reflected and diffracted into a zero order light beam and positive and negative primary light beams. The light beams are defocused so as to produce interference patterns between the zero light beam and the positive and negative primary light beams. The interference patterns are detected by a four split light detector disposed between two parts of a two split detector. The outputs of the detectors are fed to an adder and to a subtractor for producing a sum signal and a difference signal respectively. The sum signal and difference signal are fed to a phase detector. Defocusing of the light beams is effected by a focusing coil to which is fed the amplified output of an adder of a reference signal controlled by a control circuit.

5 Claims, 4 Drawing Sheets from outer periphery to inner periphery

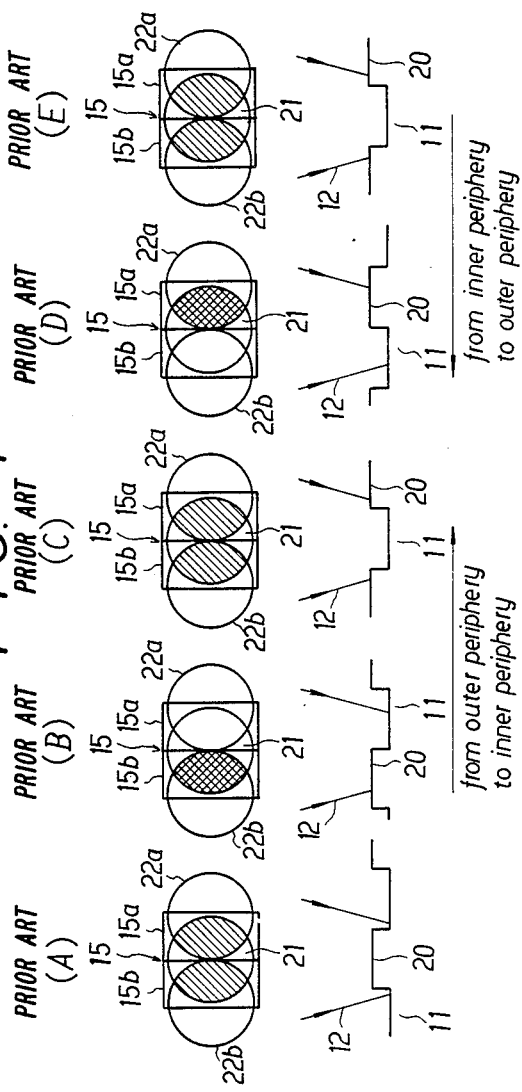

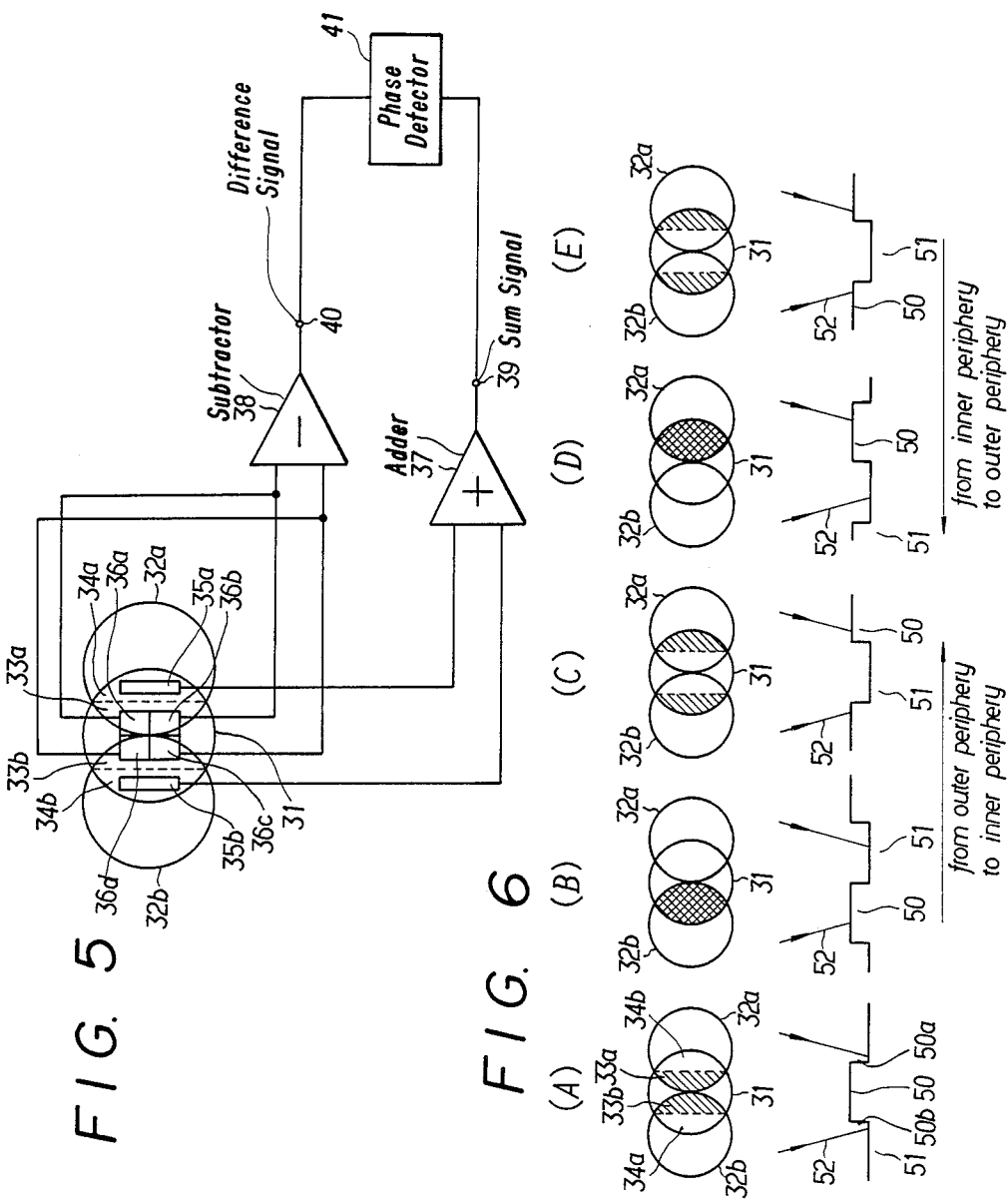

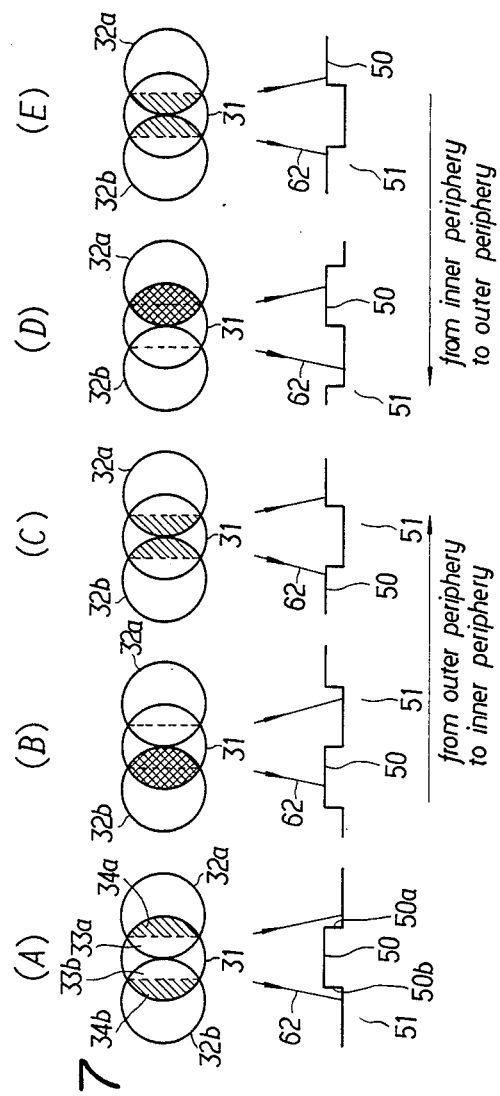
F I G. 7
F I G. 8
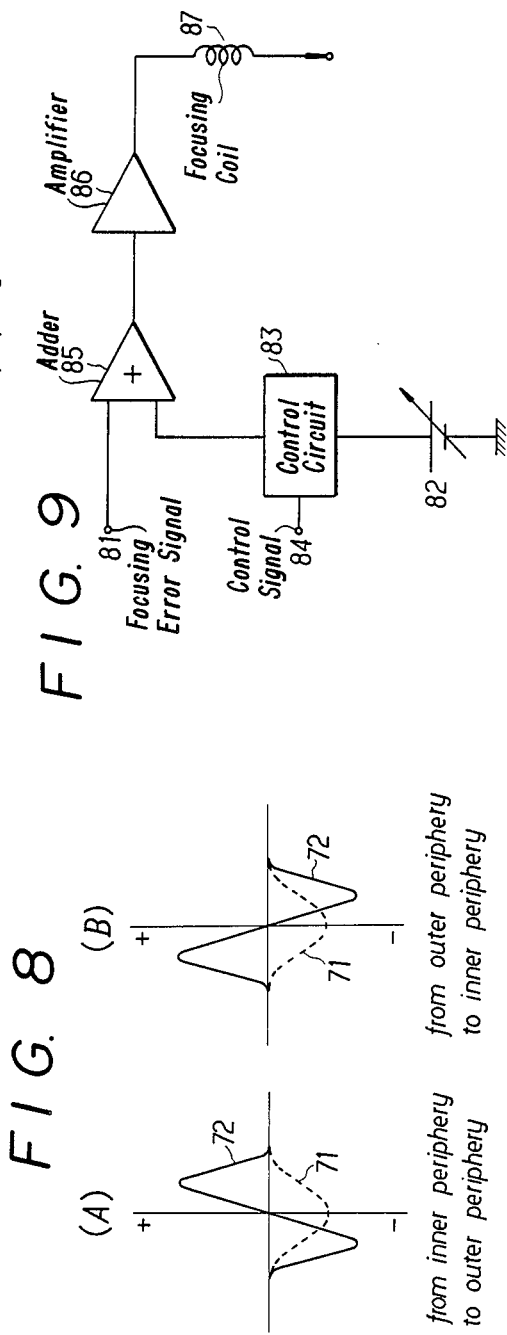
F I G. 9

METHOD AND APPARATUS FOR DETECTING TRACK CROSSINGS ON AN OPTICAL DISC

BACKGROUND OF THE INVENTION

The present invention relates to a method of detecting track crossings on an optical disc for use in a light information recording and reproducing apparatus.

As a method of recording and reproducing informations with high density, there have been provided a plurality of high information recording and reproducing methods of recording and reproducing informations with high speed and high density by irradiating a light flux with a diameter of about 1 μm from a laser light source onto a rotating record medium such as an optical disc in the form of a fine light spot. The recording and reproducing or erasing of informations on the recording medium are performed by effecting the tracking control with the following of concentric or spiral guide tracks provided on the record medium and by introducing the light beam on the desired track. In this case the method of searching a desired track with high speed is performed by the following means. Use is made of the fact that a far field pattern of the reflected laser light on the guide track formed by unevenness of recess causes a deviation or shift of light intensity distribution on both sides of the guide track direction. The deviation of the distribution is detected by a light detector having two light receiving means, of which splitting interfaces are arranged in parallel to the tangential of the track, the output signals of two light receiving means are added or subracted every time the light beam crosses the track, thereby obtaining a sum signal or a difference signal, and the direction of crossing the track by the light beam is detected by comparing phases of the sum and the difference signal waveforms thereby counting the net number of tracks.

FIG. 1 shows the construction and the action of a major part of the conventional track searching aparatus. Reference numeral 11 is an optical disc, a part of which is shown in cross section and having a guide track 10, over which there is arranged a light detector 15 having two light receiving means 15a and 15b for detecting the reflected light of an irradiating light beam 12. Outputs of the light detector 15 are added and subtracted in an adder 17 and a subtractor 18, thereby obtaining a sum signal and a difference signal. FIGS. 1A, 1B, 1C and 1D show a relative position between the light beam and the guide track in the case of movement on the optical disc of the light beam while crossing the guide track 10, show the light beam diffracted by edge portions the guide track recess, and show by the shaded portion in a circle the change of light quantity distribution within a reflected light spot 14 irradiated on the light detector 15 through a lens 13. Provided that the moving direction of the light beam from the outer periphery to the inner periphery of the disc is shown by an arrow in FIG. 1, when the light beam 12 crosses the guide track 10 and moves from the outer periphery to the inner periphery, waveforms of the sum signal 19 and the difference signal 16 produced by the light detector 15 are shown in FIG. 2A, in which the sum signal waveform is shown by a broken line and the difference signal waveform is shown by a solid line. FIG. 2B shows waveforms of the sum signals and the difference signals in case of moving the light beam in the direction from the inner periphery to the outer periphery of the disc. The moving direction of the light beam can be decided from the phase difference $\pm\theta$ shown by the waveform peak of the sum and the difference signals in accordance with the moving direction of light beam thereby performing a precise track search.

The above search method has a disadvantage of being incapable of phase-comparing by abrupt decrease of the sum signal when the track density becomes high. The value of the sum signal obtained by the conventional track searching method is decreased with high track density so that the conventional method can not perform a precise track search. This state is shown in FIG. 3. FIG. 3A shows the waveform of the sum signal obtained in the case of the track pitch of 0.25 μm and the width of the guide track recess of 0.8 μm. FIGS. 3B, 3C and 3D show respective waveforms of the sum signals obtained in the case of same track pitch of 1.6 μm and the widths of the guide track recess of 0.8 μm, 0.6 μm and 0.4 μm, respectively. It is found from FIGS. 3A to 3D that the difference (hereinafter referred to as a modulation factor) between maxium level and minimum level of the sum signal becomes substantially zero in the case of the track pitch of 1.6 μm and the guide track recess of 0.8 μm (FIG. 3B), and the modulation is smaller than that shown in FIG. 3 A in the case of the width of the guide track recess of 0.6 μm (FIG. 3C). It is also found that the modulation factor is the same as that shown in FIG. 3A in the case of the width of guide track recess of 0.4 μm (FIG. 3D).

FIG. 4 shows a distribution of light quantity of light reflected from the high density optical disc 11 having a guide track recess width of 0.8 μm and a track pitch of 1.6 μm corresponding to the disc shown in FIG. 3B, and irradiated on the light receiving means 15a and 15b of the light detector 15, in accordance with moving positions of the light beam 12 across the concave guide track 20. The changes of image formed by the reflected light are shown by the shaded portion in a circle in accordance with the cases of moving the light beam 12 in the direction from outer periphery to inner periphery of the disc (FIGS. 4A, 4B, and 4C), and in the direction from inner periphery to outer periphery of the disc (FIGS. 4A, 4D, and 4E). In FIG. 4, reference numerals 21, 22a and 22b show a light of zero order, a light of positive primary order, and a light of negative primary order, respectively. It is found from FIG. 4 that the modulation factor is not obtained from the sum signal shown in FIG. 3B corresponding to a sum of outputs of the light receiving means 15b and 15a.

SUMMARY OF THE INVENTION

It is an object of the present invention to overcome the above disadvantages of the conventional track searching method and the apparatus thereof.

It is another object of the present invention to provide a track searching method capable of precise track searching even in a recorded medium having a high density track and a wide guide track width, and a track searching apparatus.

According to the present invention there is provided a method of detecting track crossings on an optical disc, comprising the steps of providing a light source, irradiating light beams generated from the light source onto an optical disc having guide tracks in the form of a recess under the defocusing condition, detecting change of image formed by a zero order light and positive and negative primary order lights which are diffracted by the optical disc with the use of a least two light receiving means, obtaining a sum signal and a difference signal by arithmetically operating on the detected outputs, and detecting the moving direction of the light beam on the optical disc thereby searching a desired track.

According to the present invention there is also provided an apparatus for detecting track crossings on an optical disc comprising a light source, means for irradiating light beams generated from the light source onto an optical disc having guide tracks in the form of a recess under defocusing condition, a moving means for moving the light beam in the desired direction across the tracks, a light detecting means for detecting a change of image formed by a zero order light beam and positive and negative primary order light beams which are diffracted by the optical disc with the use of at least two light receiving means, and an arithmetic operating means for obtaining a sum signal and a difference signal by processing the detected outputs.

BRIEF DESCRIPTION OF THE DRAWINGS

FIGS. 2A, 2B, 3A to 3D and 4A to 4E are explanatory views showing the operation of a conventional track searching method and apparatus;

FIG. 5 is an explanatory view showing the construction and operation of a major part of a track crossing detecting and searching method and apparatus according to the present invention;

FIGS. 6A to 6E, 7A to 7E and 8A to 8B are explanatory views showing operation of the method according to the present invention;

FIG. 9 is a block diagram showing a defocusing means for use in the method according to the present invention.

DESCRIPTION OF THE PREFERRED EMBODIMENT

Figure 1:
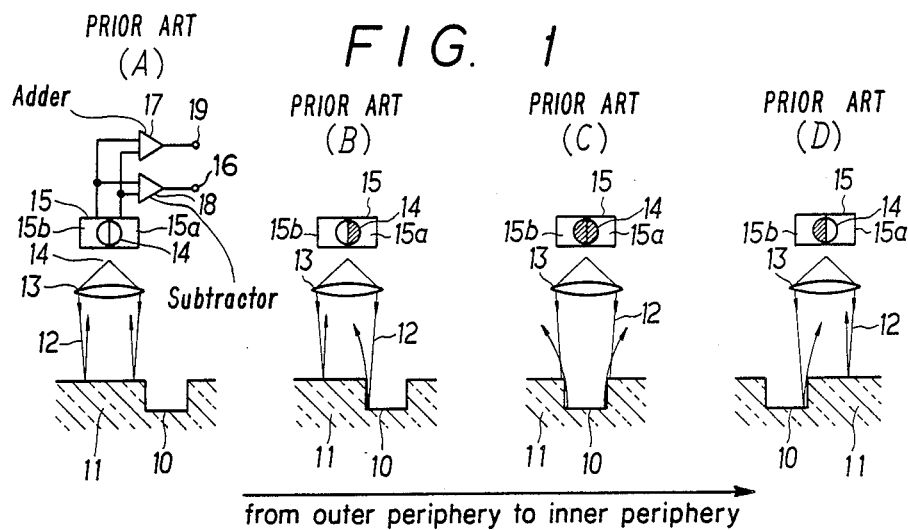
FIGS. 1A to 1D are explanatory views showing the construction and operation of a major part of conventional track searching apparatus.
Figure 2:
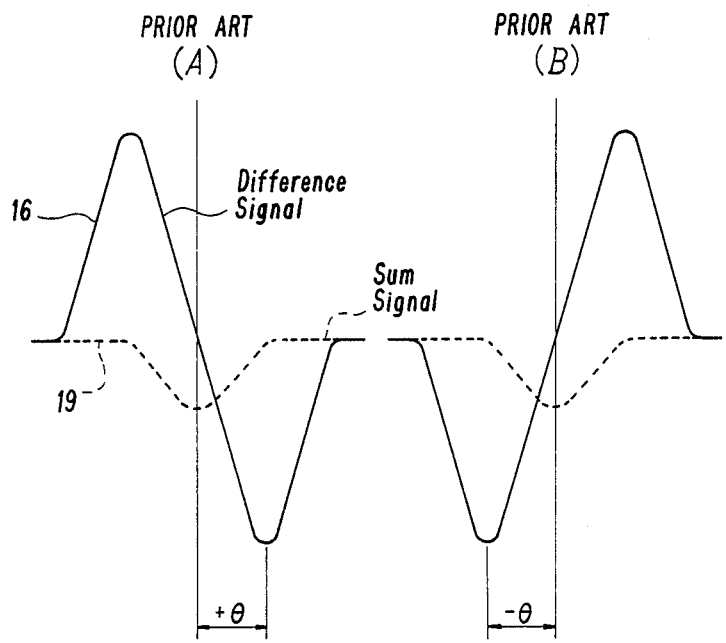

FIG. 5 shows a construction and operation of a major part of a track crossing detecting device according to the present invention.

In FIG. 5, the relation between interference patterns of a diffraction image formed on the light detector by the light beam which is irradiated on the optical disc under defocusing condition and a light detector arranged to obtain the desired output signals by detecting change of the interference pattern comprises a usual four split light detector 36a–d, and a pair of light detectors, 35a, 35b, which sandwich the four split light detector 36a–d therebetween. Reference numeral 31 is a zero order light beam of the light reflected from the optical disc, 32a a positive(+) primary order light beam, 32b a negative (−) primary order light beam, 33a, 33b interference regions interfered with the zero order light beam and the positive and the negative primary order light beams with each other, which interference regions correspond to the positive primary order light beam side and the negative primary order light beam side of an inner region opposite to each other about the zero order light beam from a center line at the interference regions, and 34a, 34b interference regions interfered with the zero order light beam and the positive and the negative primary order light beams with each other, which interference regions correspond to the positive primary order light beam side and the negative primary order lightbeam side of outer regions opposite to each other about the zero order lightbeam from the center line at the interference regions. Reference numerals 35a, 35b are light receiving means of a two split light detector for detecting change of light intensity at the interference regions 34a and 34b, and 36a, 36b, 36c, and 36d are light receiving means of a four split light detector for detecting change of light intensity at the interference regions 33a and 33b of the zero order light-beam and/or the positive and the negative primary order lightbeams. The output of the light detector having light receiving means for detecting change of the interference pattern are supplied to an adder 37 and a subtractor 38 to produce a sum signal 39 and a difference signal 40 which are fed to a phase detector 41 for detecting phase difference between the outputs of the adder 37 and subtractor 38.

The operation of the method according to the present invention is descrived as follows.

FIGS. 6A to 6E show the relative positional relation between the light beam and the guide tracks when a light beam 52 is irradiated on an optical disc 50 having a concave guide track recess 51 with a track pitch of 1.6 $\mu$m, a guide track recess width 0.8 $\mu$m, and a recess depth of $\lambda/8n$ ($\lambda$ is the wavelength of light from a light source, and n is refractive index) under defocusing condition, and the light beam crosses over guide tracks and moves on the optical disc, and further shows change of the interference pattern formed by interfering with the zero order light beam 31 the positive primary order light beam 32a and the negative primary order light beam 32b, which are diffracted by the optical disc and irradiate on the light detector. FIGS. 6A, 6B, and 6C show the changes of image formed with diffracted light by a shaded portion in the circle 31 in accordance with the case of moving light beams from the outer periphery to inner periphery of the disc, and FIGS. 6A, 6D and 6E show the changes of image formed with diffracted light by a shaded portion in the circle 31 in accordance with the case of moving the light beams from inner periphery to outer periphery of the disc.

FIGS. 7A to 7E show relative positional relation between the light beam and the guide tracks when a light beam 62 is irradiated on the optical disc 51 under defocusing condition obtained by offsetting the focus in the opposite direction to the case shown in FIG. 6, and the light beam crosses over guide tracks and moves on the optical disc, and further shows the change of image formed by diffracted light. FIGS. 7A, 7B and 7C show the case of moving light beams from the outer periphery to the inner periphery of the optical disc and FIGS. 7A, 7D and 7E show the case of moving light beams from the inner periphery to the outer periphery of the optical disc.

FIGS. 8A and 8B show a sum-signal 71 and a difference signal 72 which are obtained in accordance with change of the interference patterns as shown in FIG. 6 according to the apparatus shown in FIG. 5. FIG. 8A shows the case of moving light beams from the inner periphery to the outer periphery of the optical disc.

As shown in FIGS. 6, 7 and 8, according to the present invention a sum or added signal having a clear modulation factor can be obtained as compared with the sum signal obtained by the conventional track searching apparatus shown in FIG. 3B so that phases of the sum signal and the difference signal can be compared clearly and thus the moving direction of the light beam on the optical disc can be decided clearly thereby performing precise track searching. Therefore, track searching can be performed with high speed for any track of the optical disc resulting in a realization of light information recording and reproducing apparatus with high reliability.

Similarly, precise track searching can be performed by using a sum signal and a difference signal (not shown) which are obtained in accordance with change of the interference patterns as shown in FIG. 7.

FIG. 9 shows means for irradiating light beams with the use of defocusing means according to the present invention. Reference numeral 81 is an input terminal of the focusing error signal, 82 a voltage source for generating a reference voltage which performs desired offsetting, 83 a control circuit for controlling application of a reference voltage which is supplied to an adder 85 under the control of a control signal 84, and comprising transistors, photocouplers and analog switches, 86 an amplifier for driving a focusing coil, and 87 a focusing coil for adjusting focus of an optical system. In this defocusing means, the control means 83 is operated by the control signal 84, the desired reference voltage is superimposed to the focusing error signal 81 and the superimposed voltage is supplied to the focusing coil 87 through the amplifier 86 thereby offsetting the focus resulting in a defocusing condition.

It is further understood by those skilled in the art that the foregoing description is a preferred embodiment of the disclosed device and that various changes and modifications may be made in the invention without departing from the spirit and scope thereof.

What is claimed is:

1. A method of detecting track crossings on an optical disc comprising, the steps of providing a light source, irradiating a light beam from said light source onto an optical disc having guide tracks each in the form of a recess, said light beam being reflected as a zero order light flux and positive and negative primary order light fluxes, defocusing said light beam, detecting by at least two light receiving detectors a change of image of a diffracted spot of light formed by said zero order light flux and said positive and negative order light fluxes reflected and diffracted from said optical disc, feeding outputs of said detectors to a subtractor and to an adder to obtain a sum signal and a difference signal by arithmetically operating on said detected outputs, feeding said sum signal and said difference signal to phase detecting means for detecting the phase relation between the outputs of said subtractor and adder, determining the direction of crossing the tracks by the light beam by comparing the phases of the sum signal and difference signal, and said defocusing of said light beam being effected by controlled application of a reference voltage applied to another adder under control of a control signal, and amplifying the output of said another adder and applying said output to a defocusing coil for defocusing said light beam irradiating the optical disc tracks.

2. A method of detecting track crossings on an optical disc according to claim 1, in which upon completion of a track crossing detecting operation, said defocusing of said light beam is removed.

3. Apparatus for detecting track crossings on an optical disc comprising, a light source, means for irradiating a light beam from said light source onto an optical disc having guide tracks each in the form of a recess, said light beam being reflected as a zero order light flux and positive and negative primary order light fluxes, controllable means for defocusing said light beam, means for detecting reflected light diffracted from said optical disc, said detecting means comprising a four element split light detector arranged to receive light reflected and diffracted from said optical disc, adder means and subtractor means for receiving outputs from said detector and producing a sum signal and a difference signal, means including phase detecting means for receiving said sum signal and difference signal and determining the phase relation between them for determining the direction of crossing of the tracks by said light beam, said defocusing means comprising a focusing coil, an adder receiving a reference voltage under control of a control circuit, and means for amplifying the output of said adder and feeding the amplified output of said adder to said focusing coil.

4. Apparatus according to claim 3, in which said detecting means comprises said four element split light detector disposed between two parts of a two element split light detector.

5. Apparatus according to claim 3 in which said four element split light detector comprises four light detector elements split by a line parallel to the longitudinal direction of the track of said optical disc and a line intersected at right angles thereto.

* * * * *